United States Patent
Sultan et al.

(10) Patent No.: US 12,204,452 B2
(45) Date of Patent: Jan. 21, 2025

(54) SYSTEMS AND METHODS TO GENERATE A MISS RATIO CURVE FOR A CACHE WITH VARIABLE-SIZED DATA BLOCKS

(71) Applicants: HUAWEI TECHNOLOGIES CANADA CO., LTD., Kanata (CA); The Governing Council of the University of Toronto, Toronto (CA)

(72) Inventors: Sari Sultan, Toronto (CA); Kia Shakiba, Toronto (CA); Albert Lee, Toronto (CA); Michael Stumm, Toronto (CA); Ming Chen, Kanata (CA); Chung-Man Abelard Chow, Kanata (CA)

(73) Assignees: HUAWEI TECHNOLOGIES CANADA CO., LTD., Kanata (CA); THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 81 days.

(21) Appl. No.: 17/982,070

(22) Filed: Nov. 7, 2022

(65) Prior Publication Data
US 2024/0160572 A1 May 16, 2024

(51) Int. Cl.
*G06F 12/0815* (2016.01)

(52) U.S. Cl.
CPC .. *G06F 12/0815* (2013.01); *G06F 2212/6042* (2013.01)

(58) Field of Classification Search
None
See application file for complete search history.

(56) References Cited

U.S. PATENT DOCUMENTS

| | | | |
|---|---|---|---|
| 10,895,985 B1 * | 1/2021 | Vasquez | G06F 3/064 |
| 2005/0188164 A1 * | 8/2005 | Ballantyne | G06F 9/5016 |
| | | | 711/170 |
| 2015/0046653 A1 * | 2/2015 | Soundararajan | G06F 12/0811 |
| | | | 711/146 |
| 2017/0060769 A1 * | 3/2017 | Wires | G06F 12/1018 |
| 2018/0046383 A1 | 2/2018 | Gates | |
| 2018/0275909 A1 | 9/2018 | Agrawal | |
| 2021/0117322 A1 | 4/2021 | Baughman | |
| 2023/0244669 A1 | 8/2023 | Wu | |

OTHER PUBLICATIONS

R.L. Mattson et al., TraigerEvaluation techniques for storage hierarchies, IBM Syst J, 1970, p. 78 to 117.
Jake Wires et al., Characterizing Storage Workloads with Counter Stacks, Oct. 2014.
HyperLogLog: the analysis of a near-optimal cardinality estimation algorithm, Philippe Flajolet, Éric Fusy, Olivier Gandouet and Frédéric Meunier, DMTCS proc. AH, 2007, 127-146, 2007 Conference on Analysis of Algorithms.

* cited by examiner

*Primary Examiner* — Sanjiv Shah
*Assistant Examiner* — Alexander J Yoon

(57) ABSTRACT

A method to obtain a cache miss ratio curve where a memory blocks of a cache have variable block sizes. By stacking sets of counters, each set being for a different block size, a stack distance for variable block sizes can be obtained and used to determine a miss ratio curve. Such curve can then be used to select a cache size that is appropriate for an application without requiring excessive memory. Methods can be used for batches of request, can apply limits to block sizes, and rounding for intermediary block sizes, they can be used with pruning, and their space complexity can be held constant.

16 Claims, 9 Drawing Sheets

SYSTEMS AND METHODS TO GENERATE A MISS RATIO CURVE FOR A CACHE WITH VARIABLE-SIZED DATA BLOCKS

CROSS-REFERENCE TO RELATED APPLICATIONS

This is the first application filed for the present invention.

TECHNICAL FIELD OF THE INVENTION

This invention pertains generally to cache management and in particular, to methods and systems to allocate a cache using a miss ratio curve.

BACKGROUND

The miss rate or miss ratio of requests in a cache can be defined as the number of cache misses divided by the total number of cache memory requests over a given time interval:

$$\text{miss ratio} = \frac{[\text{number of cache misses}]}{[\text{number of cache requests}]}$$

Similarly, a miss ratio curve (MRC) for a cache presents a miss ratio as a function of a cache's size. In the prior art, one approach to generate a miss ratio curve is to calculate stack distances for data blocks (sequences of bits or bytes) in the cache and determine a frequency of occurrence for each stack distance, over a certain time, as a histogram. An MRC can be generated as an inverse cumulative distribution function (CDF) of the stack distance histogram, as presented in Mattson et al. (R. L. Mattson, J. Gecsei, D. R. Stutz and I. L. Traiger, "Evaluation techniques for storage hierarchies," *IBM Systems Journal*, vol. 9, no. 2, pp. 78-117, 1970). That method introduces the concept of a "stack distance", which refers to the position, in a stack of data blocks, of the most recently referenced data block. Although a basic stack distance computation method can be somewhat inefficient, other MRC methods based on stack distance can include further techniques to enhance its efficiency.

One limitation of an MRC technique according to prior art is the inability to support variable-sized data blocks.

Therefore, there is a need for MRC methods having the ability to support variable-sized data blocks, as well as systems to implement such methods, and such methods and systems would obviate or mitigate limitations of the prior art.

This background information is provided to reveal information believed by the applicant to be of possible relevance to the present invention. No admission is necessarily intended, nor should be construed, that any of the preceding information constitutes prior art against the present invention.

SUMMARY

Methods and systems disclosed allow the determination of a miss ratio curve (MRC) for caches using variable-sized memory blocks. Compatibility with variable-sized blocks allow an overall reduction in cache memory requirements and improved cache performance.

Technical benefits include compatibility with applications using data blocks having different sizes. For example, an application using two primary kinds of data, such as text messages and images, two different sizes of data blocks can be used such that one size is sufficient to accommodate a text message and the other size is sufficient to accommodate an image. Reserving the larger blocks sizes for images instead of text messages allows an economy of space. Methods according to embodiments allow the determination of a miss ratio curve, where a cache is using such variable block sizes. The miss ratio curve can then be used to allocate the cache size to be just sufficient to use of the application, and further spare memory space.

Embodiments of the present disclosure include a method to allocate a cache size comprising receiving a plurality of requests, each request for accessing a cached data block of a specified size; generating a stack of sets of counters, each set being a map of at least two counters; determining a plurality of stack distances from the stack of sets of counters; generating a miss ratio curve from a frequency distribution of the stack distances; determining the cache size according to the miss ratio curve; and allocating a cache of the determined cache size to satisfy a given performance requirement.

In an embodiment, each set of the sets of counters can include a counter for each data block of the specified size.

In an embodiment, generating a stack of sets of counters can comprise adding, at successive time steps, one set of counters for each time step; initializing to value "1" a counter in the one set of counters when a data block having a memory size corresponding to the counter is first accessed; initializing to value "0" a counter in the one set of counters when a data block having memory size other than the memory size corresponding to the counters is accessed; and incrementing existing counters when a data block having a memory size corresponding to the counter is first accessed.

In an embodiment, determining a stack distance from the stack of sets of counters, at a time step t, can comprise locating, at the time step t, a first counter $c_{i,t}^{block\ size}$ at row i and a second counter $c_{i+1,t}^{block\ size}$ at row i+1, each counter for the same block size, such that the counter $c_{i,t}^{block\ size}$ at row i does not increment and the counter $c_{i+1,t}^{block\ size}$ at row i+1 does increment; and selecting the value of the counter $c_{i,t}^{block\ size}$ that does not increment, wherein the block size is the block size accessed at time step t.

In an embodiment, each counter can be for counting unique accesses to cached data blocks having the same size as a data block being requested.

In an embodiment, a method can further comprise hashing, for each request, an address key of the requested data block into a binary sequence; and adding each resulting binary sequence to a corresponding counter of the set of counters.

In an embodiment, a method can further comprise merging a present counter with previous counters having the same memory size; computing a number of cache hits using a current stack of counters and the previous stack of counters; and considering the number of hits in the frequency distribution of the stack distances for generating the miss ratio curve.

In an embodiment, the size of a data block can be $B^m$ bytes, B and m being integers, and a number $n_c$ of counters in a set of counters can be limited to $n_c = m+1$.

In an embodiment, a method can further comprise pruning a counter if the counter's value is at least $(1-\delta)$ times the value of a corresponding counter in the next oldest set of counters, $\delta$ being a real number selected based on a memory limitation.

In an embodiment, a method can further comprise, if the number of counters is greater than a threshold determined by memory space limitations, invoking successive pruning operations, while increasing δ at each repetition, until at least one of the existing counters is pruned.

In an embodiment, a method can further comprise, if a request is for a memory block of a size that is not available, accessing an available memory block of a size corresponding to a rounding up of the memory block size being requested.

In an embodiment, a counter can be a hyperloglog (HLL) counter.

In an embodiment, generating a miss ratio curve from a frequency distribution of stack distances can comprise generating an inverse cumulative distribution function (CDF) of the frequency distribution of stack distances.

Embodiments of the present disclosure include a system for allocating a cache size comprising at least one processor, at least one cache, and machine readable memory storing machine readable instructions which when executed by the at least one processor, configures the at least one processor to receive a plurality of requests, each request for accessing a cached data block of a specified size; generate a stack of sets of counters, each set being a map of at least two counters; determine a plurality of stack distances from the stack of sets of counters; generate a miss ratio curve from a frequency distribution of the stack distances; determine the cache size according to the miss ratio curve; and allocate a cache of the determined cache size to satisfy a given performance requirement.

In an embodiment, each set of the sets of counters includes a counter for each data block of the specified size.

In an embodiment, each counter is for counting unique accesses to cached data blocks having the same size as a data block being requested.

In an embodiment, machine readable memory storing machine readable instructions can further configure the at least one processor to prune a counter if the counter's value is at least (1−δ) times the value of a corresponding counter in the next oldest set of counters, δ being a real number selected based on a memory limitation.

In an embodiment, machine readable memory storing machine readable instructions can further configure the at least one processor to, if the number of counters is greater than a threshold determined by memory space limitations, invoke successive pruning operations, while increasing δ at each repetition, until at least one of the existing counters is pruned.

In an embodiment, machine readable memory storing machine readable instructions can further configure the at least one processor to access an available memory block of a size corresponding to a rounding up of the memory block size being requested.

In an embodiment, a counter is a hyperloglog (HLL) counter.

Embodiments have been described above in conjunction with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are incompatible with each other, it will be apparent to those skilled in the art. Some embodiments may be described in relation to one aspect, but may also be applicable to other aspects, as will be apparent to those of skill in the art.

BRIEF DESCRIPTION OF THE DRAWINGS

It will be noted that throughout the appended drawings, like features are identified by like reference numerals.

DETAILED DESCRIPTION

One limitation of an MRC technique according to prior art is the inability to support variable-sized data blocks, which is a feature in modern caching systems. For conventional MRC techniques, memory space is often partitioned into equally sized blocks and referred to as "pages". However, this can limit their use. The use of variable-sized blocks would be interesting for a communication system transmitting data blocks having various sizes, such as for example text messages and photos. With variable-size blocks, there is no need to use a photo-sized memory block (>100 KB) for a text message if a text-sized memory block (<1 KB) is available. An MRC technique applicable to variable-sized blocks could overcome the limitation of having to use a large memory block (>100 KB) for processing or transmitting a small (<1 KB) message.

Embodiments include methods to obtain a miss ratio curve (MRC) for caches supporting variable-sized memory blocks. Benefits of using variable-sized blocks include smaller memory requirements and improved performance of a cache. Therefore, if a miss ratio curve (MRC) can be obtained with variable-sized memory blocks, a caching system can be designed not only with variable sized memory blocks, but also with consideration of a corresponding MRC calculation.

To improve cache utilization, a method according to embodiments can be implemented by a caching system provided by a cloud-based platform. Based on an MRC result generated, the cache size of a workload can be adjusted. As a result, a customer can return unused cache resources to the cloud-based platform and therefore pay less for a service, while the platform can resell the unused resources for more revenue.

A method according to embodiments can support variable-sized blocks, by using a data structure based on counter stacks.

In embodiments, a "counter stack" (i.e. a stack of counters) generally refers to a data structure for which a stack distance can be calculated. A stack distance calculation based on counter stacks can be used to efficiently generate an MRC and allow further performance improvement techniques such as "streaming traces", "pruning", "down sampling", and the use of a "HyperLogLog" (HLL) method to estimate the number of unique elements (cardinality) in a data set.

In an embodiment, an HLL method is a probabilistic method for determining the cardinality of a set of data, i.e. the number of unique elements in the set. It is based on an assumption that a hash function generates equally distributed hashed values. By using such hashed values, the HLL method can approximate the number of unique elements in a data set.

Figure 1B:
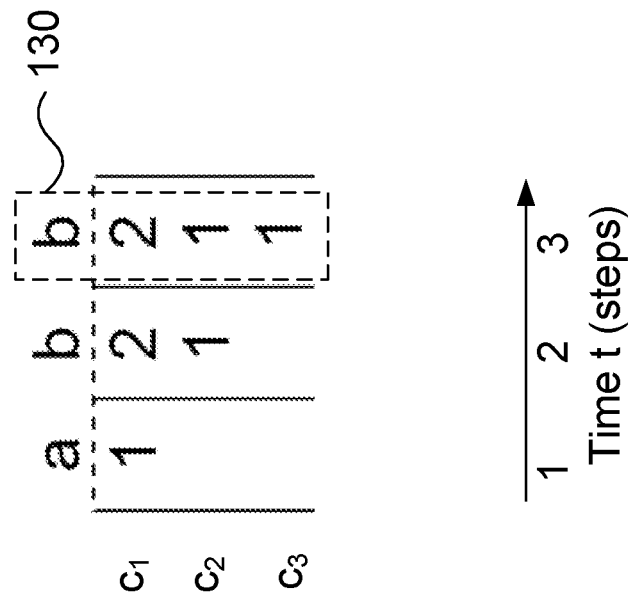
FIG. 1b illustrates the counter stack of FIG. 1a, with emphasis on the latest state used to determine a stack distance.
Figure 1A:
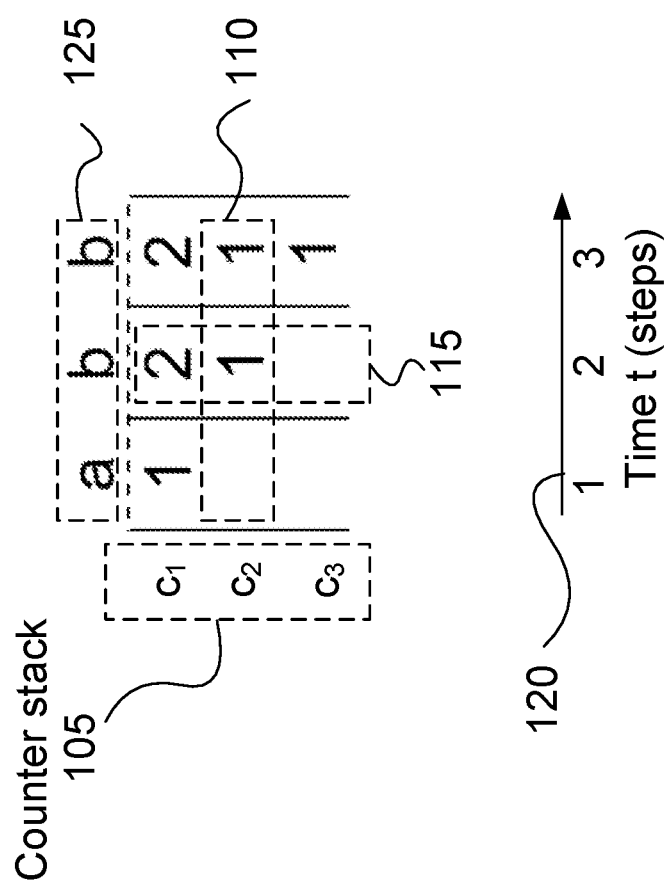
FIG. 1a illustrates the state of a counter stack as it evolves in time.

FIG. 1a illustrates the state of a counter stack as it evolves in time. A stack 105 of three counters is shown in a column at the left of a matrix. Each row 110 of the matrix corresponds to a counter and shows the counter's state at successive time steps 120. Each column 115 of the matrix represents the state of the counter stack 105 at a certain time step 120. A counter's value is a matrix element the position of which can be identified by a counter number y and a state at time t: $c_{y,t}$.

A top row above the matrix illustrates a trace 125 of accesses to data blocks including data block a, data block b, and possibly more, by a cache client. The matrix is populated as follows. For counter $c_1$ between time step "1" and time step "3", two different elements are accessed: data block "a" and data block "b". Therefore, the value for counter $c_1$ at time step t=3 is $c_{1,3}=2$. For counter $c_2$ between time step t=1 and time step t=2, only one unique element is accessed: data block "b", and therefore the value for counter $c_2$ at time step t=2 is $c_{2,2}=1$. The value of a counter at time t, shown as a matrix element, is the number of different data blocks having been accessed between time step t=1 and time step t.

FIG. 1b illustrates the counter stack of FIG. 1a, with emphasis on the latest state used to determine a stack distance. After a matrix is populated with counter values for accesses to "a" and/or "b" as in FIG. 1a, the method of FIG. 1b involves looking at the next-to-last and last columns (columns 2 and 3, or time steps 2 and 3), the last column being the "latest state" when a stack distance is to be determined. Therefore, each time a stack is updated with a new column in FIG. 1a, a new stack distance can be determined as in FIG. 1b. There is one stack distance per counter, and between for example time 1 and time 2, the stack distance for a counter is the counter's value. Determining a stack distance with a counter stack can involve identifying in the latest state (column) 130 a counter for which the value has not increased, for example:

From time step 2 to time step 3, the state of counter $c_1$ has not increased from value 2 to value 2, therefore it is acceptable.

From time step 2 to time step 3, the state of counter $c_2$ has not increased from value 1 to value 1, therefore it is acceptable.

From time step 2 to time step 3, The state of counter $c_3$ has been initialized from no value to value 1, therefore it is not acceptable.

Then, from the acceptable counters $c_1$ and $c_2$, the method involves selecting from counter $c_1$ and $c_2$ the counter for which the next counter, $c_2$ and $c_3$ respectively, increases in value from time step 2 to time step 3. For example:

For counter $c_1$, the next counter $c_2$ does not increase in value from 1 to 1, and therefore counter $c_1$ is not acceptable.

For counter $c_2$, the next counter $c_3$ does increase from no value to 1, therefore counter $c_2$ is acceptable and because it is the only counter being acceptable for both criteria, it is selected.

Identifying for the selected counter $c_2$ its row number, which is 2, and its column number, which is 3.

By selecting counter $c_2$, the above method has identified when the data block accessed at time step "3", i.e. data block "b", was last accessed, and the answer is time step "2", because counter $c_2$ does not increase in value from 1 to 1. The stack distance, between the access to data block b at time t=3 and the last access to data block b at time=2, is the value in counter $c_{2,3}$, which is "1".

In FIGS. 1a and 1b, the data blocks (a, b) shown in the top row 125, and that are successively accessed, have similar or identical sizes. Embodiments, however, allow for data blocks with different sizes, i.e. variable-sized blocks. To support variable-sized blocks, a feature of a method according to embodiments is that instead of including a mere stack of counters 105, an embodiment includes a stack of "counter sets", where each counter set $C_i$ (i=1, 2, 3, ... ) is a map. Each map entry corresponds to a counter $c_i^{block\ size}$ or $c_i^{size\ in\ K}$ identified by a counter set i and a block size, such as a size in K (i.e. KB or kilobytes). For example, a stack S can include six counter sets $c_i$, where each counter set $C_i$ includes one counter $c_i^{4K}$ for blocks of size 4K and one counter $c_i^{2K}$ for blocks of size 2K:

$$S=\{C_1,C_2,C_3,C_4,C_5,C_6\}$$

$$S=\{c_1^{4K},c_1^{2K},c_2^{4K},c_2^{2K},c_3^{4K},c_3^{2K},c_4^{4K},c_4^{2K},c_5^{4K},c_5^{2K},c_6^{4K},c_6^{2K}\}$$

For variable-sized blocks according to embodiments, a stack distance can be calculated as a sum of weighted block sizes, where each weight (multiplication factor) is a counter $c_i^{size\ in\ K}$ of a set S, as follows:

$$\text{stack distance} = \sum_{c_i^{size\ in\ K} \in S} c_i^{size\ in\ K} \times (\text{Size in K})$$

where S is a set of counters $C_i^{size\ in\ K}$ acting as weights (i.e. multiplication factors).

A method according to embodiments can support variable-sized blocks, by using a data structure based on counter stacks. Initially, a the method involves receiving a plurality of requests, each request for accessing a cached data block of a specified size. Then, a stack of sets of counters is generated, each set being a map of at least two counters. Then, a plurality of stack distances can be determined from the stack of sets of counters and a miss ratio curve can be generated from a frequency distribution of the stack distances. A cache size can be selected according to the miss ratio curve; and a cache can be allocated to the determined cache size, such as to satisfy a given performance requirement.

In an embodiment, each set of the sets of counters can include a counter for each data block of the specified size, and each counter can be a hyperloglog (HLL) counter.

When generating a stack of sets of counters, the method involves adding, at successive time step, one set of counters for each time step. It can initialize to value "1" a counter in the one set of counters when a data block having a memory size corresponding to the counter is first accessed and initialize to value "0" a counter in the one set of counters, when a data block having memory size other than the memory size corresponding to the counter is accessed. Existing counters are incremented when a data block having a memory size corresponding to the counters is first accessed.

The following is an example of how a data structure for a stack of counter sets according to embodiments can support blocks of various sizes, when calculating a stack distance.

Figure 2:
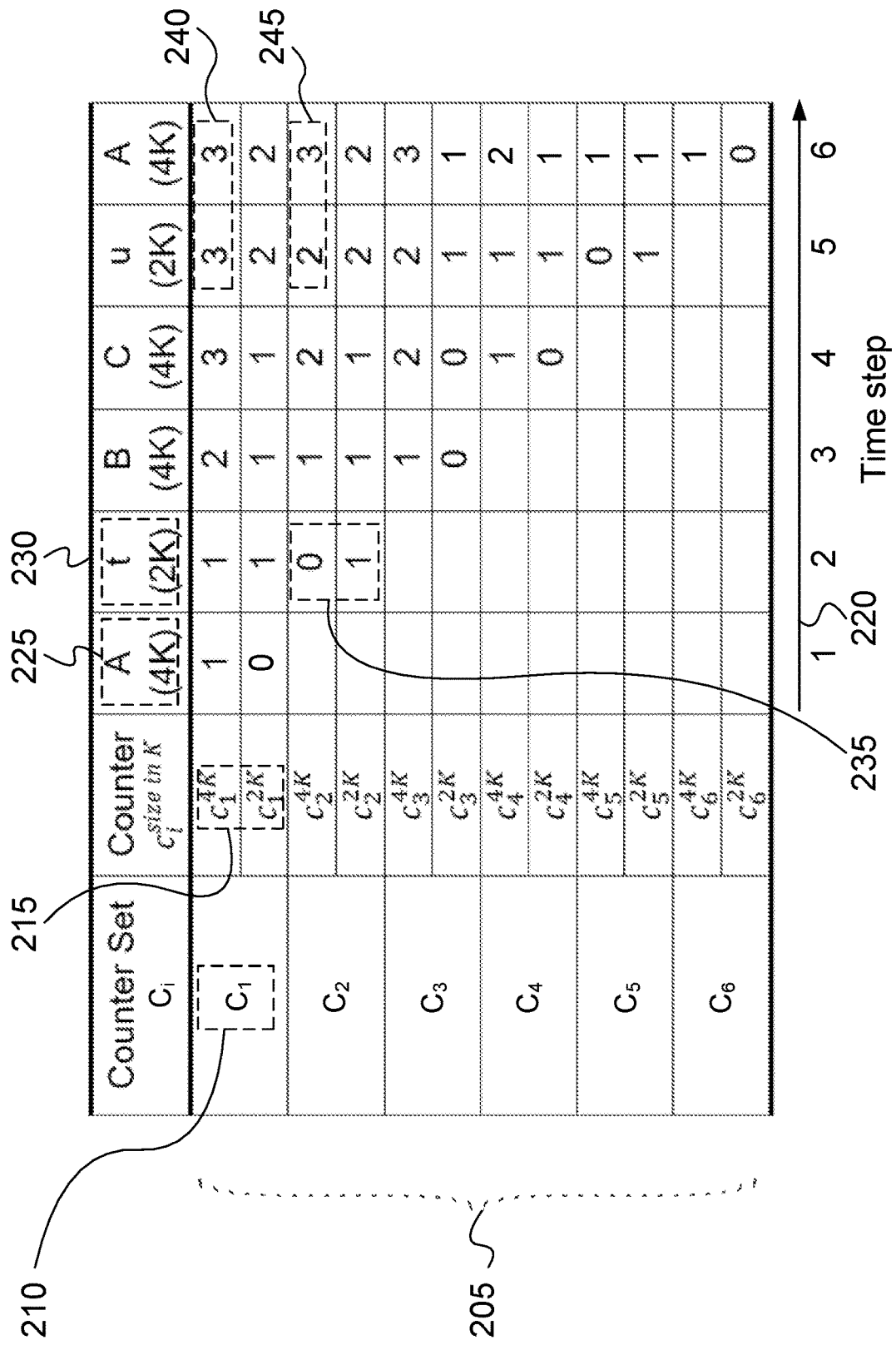
FIG. 2 is a table representing the data structure of a stack of counter sets, and how the counters evolve in time, according to an embodiment.

FIG. 2 is a table representing the data structure of a stack of counter sets, with each counter set containing a map of counters, and how each counter evolves in time, according to an embodiment. A stack 205 includes six counter sets 210, each counter set 210 contains a map of two 215 counters, each counter corresponding to a block size, i.e. 4K or 2K. Each counter is for counting unique accesses to cached data blocks having the same size as a data block being requested, and each row represents the state of a counter at different time steps 220.

In a stack 205 of counter sets according to an embodiment, a counter from a counter stack 105 of the prior art is replaced with a set of counters 210 from a stack of counter sets. The first column of the table in FIG. 2 therefore includes six distinct counter sets: $C_1$, $C_2$, $C_3$, $C_4$, $C_5$, $C_6$, each set being an array of two counters $c_i^{size\ in\ K}$ shown in the second column, each counter of a set corresponding to one of two block sizes. For example, set $C_1$ includes 215 counter $c_1^{4K}$ and counter $c_1^{2K}$. Each counter is added at a certain time step 220 from time t=1 to time t=6. And when a counter is added, it is initialized 235 to 0 or 1, depending on whether the size of the accessed data block is 2K or 4K. For example, at time step 2, counter $c_2^{4K}$ is added to set $C_2$, and it is initialized to 0, while counter $c_2^{2K}$ is added to the same set $C_2$ but initialized to 1 instead. The initial value of initialization corresponds to the memory size of the accessed data block t (230), which is 2K.

At each time step, a data block shown in the top row is accessed. For example, at time step 1, a data block "A" 225 with memory size 4K is accessed, and this initializes counter $c_1^{4K}$ to value "1", which is for a 4K data block. In FIG. 2, data blocks identified with an upper case letter (i.e. A, B, C) indicate a 4K block size, and data blocks identified with a lower case letter (i.e. t, u) indicate a 2K block size.

At time step 2, there is an access to data block "t" 230, which has a size 2K (2 kilobytes). This initializes counter $c_1^{2K}$, as well as a new counter $c_2^{2K}$, which are both for data blocks of size 2K. Counter $c_1^{4K}$ is not incremented because it is not for a data block of size 2K, and counter $c_2^{4K}$ is initialized to "0", because it is also not for a data block of size 2K. At subsequent time steps, further counters are similarly initialized and incremented, depending on the size of the data block accessed at that time step. Accordingly, the earliest counter set $c_1$ 210 is at the top of the table and the latest counter set $C_6$ is at the bottom.

At a time step 1, there is an access to data block "A" 225, which has size 4K. A counter set $C_1$ is added and initialized, and a counter $c_1^{4K}$ is added to counter set $C_1$. Starting from when counter set $C_1$ is initialized, counter $c_1^{4K}$ counts the number of unique accesses to blocks of size 4K, between time step 1 and the present time step, as can be seen by following its row from time step 1 to time step 6. The present time step can be noted with a second subscript. If the present time step is "6", then counter $c_1^{4K}$ can be noted as $c_{1,6}^{4K}$. At t=6 for example, the value of $c_{1,6}^{4K}$ is the number of unique accesses to data blocks of 4K, between t=1 and t=6. From t=1 to t=6, accesses to 4K data blocks are (A, B, C, A). The unique accesses in this time frame are to data blocks A, B, and C, hence the value of $c_{1,6}^{4K}$ is "3".

At time step 1, a first distinct element of size 4K (data block A) 225 is accessed. Therefore, counter $c_1^{4K}$ is initialized to value 1, while counter $c_1^{2K}$ is initialized to value 0.

At time step 2, there is an access to data block "t" 230, which has a size 2K (2 kilobytes). A counter set $C_2$ is added and initialized 235, including a counter $c_2^{4K}$ for blocks of size 4K and a counter $c_2^{2K}$ for blocks of size 2K. Because the accessed block's size is 2K, counter $c_2^{4K}$ is initialized to 0 and counter $c_2^{2K}$ is initialized to 1.

In an example, the counters can evolve in time, and at time step 6, there can be an access to data block A. The following is an example of a stack distance determination by a processing system, where data blocks are accessed as shown in FIG. 2.

To determine a stack distance for a counter set according to an embodiment represented by FIG. 2, an initial step can be identifying the last access to data block A, by locating a pair of counters for the same block size, $c_i^{size\ in\ K}$ and $c_{i+1}^{size\ in\ K}$, such that: counter $c_i^{size\ in\ K}$ does not increment and subsequent counter $c_{i+1}^{size\ in\ K}$ does increment. For example, from time step 5 to time step 6, there is no incrementation 240 from counter $c_{1,5}^{4K}$, which is 3, to counter $c_{1,6}^{4K}$, which is also 3. However, there is an incrementation 245 from counter $c_{2,5}^{4K}$, which is 2, to counter $c_{2,6}^{4K}$, which is 3.

Then, a subsequent step can be identifying the matrix element having the row number of the non-incrementing 240 counter $c_1^{4K}$, and the present column: row 1 and column 6. The value of that counter is 3, which can be used to evaluate a stack distance in terms of memory size as follows:

stack distance at time "6"=[(value of $c_{1,6}^{4K}$)×4K]+ [(value of $c_{1,6}^{2K}$)×2K]

stack distance at time "6"=[3×4K]+[2×2K]

stack distance at time "6"=[12K]+[4K]

stack distance at time "6"=16K

In other words, determining a stack distance from the stack of sets of counters, at a time step t, can comprise locating, at the time step t, a first counter $c_{i,t}^{block\ size}$ at row i and a second counter $c_{i+1,t}^{block\ size}$ at row i+1, each counter for the same block size, such that the counter $c_{i,t}^{block\ size}$ at row i does not increment and the counter $c_{i+1,t}^{block\ size}$ at row i+1 does increment; and selecting the value of the counter $c_{i,t}^{block\ size}$ that does not increment, where the block size is the block size accessed at time step t.

In the prior art, a stack distance is a counter's value, which is the unique access of a block between two time steps. This can be viewed as number of data blocks (each block having a size in KB) between the two accesses. But because embodiments involve variable sized blocks instead of same size blocks, the number of block is multiplied by the corresponding block size.

In the above, a method according to an embodiment allows the determination of a stack distance where variably sized blocks are taken into account. Once many stack distances are available, a stack distance distribution can be plotted as a histogram (a distribution of frequency for each stack distance), and an MRC can be generated on a scatter plot, as an inverse cumulative distribution function (CDF) of the stack distance histogram. In other words, generating a miss ratio curve from a frequency distribution of stack distances comprises generating an inverse cumulative distribution function (CDF) of the frequency distribution of stack distances.

Figure 3:
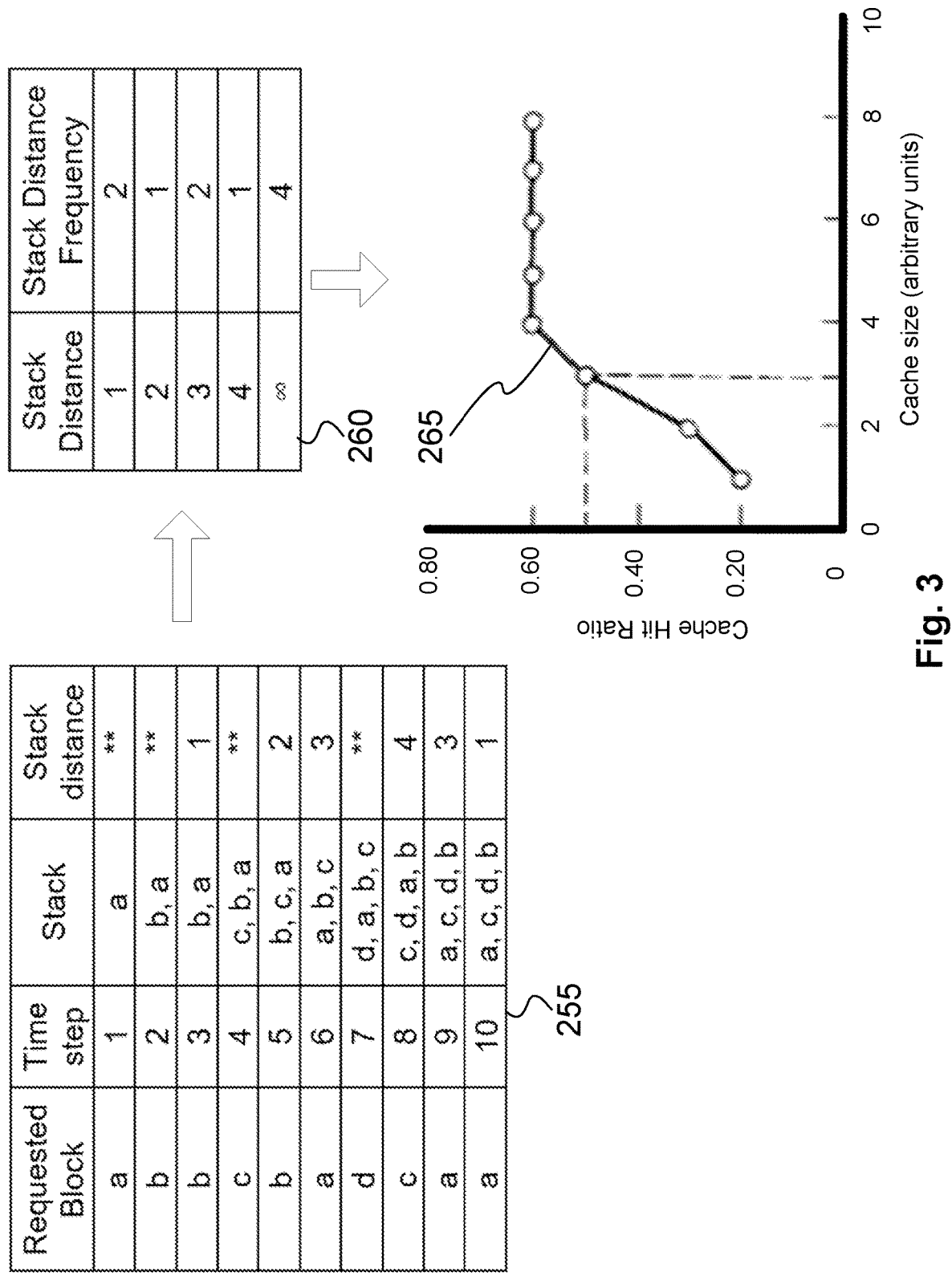
FIG. 3 is a schematically illustrates three main steps to generate an MRC, according to embodiment

FIG. 3 is a flowchart illustrating three main steps to generate an MRC, according to embodiment. Initially, a stack distance is determined each time a block is requested 255. Then, the frequency of each stack distance is obtained, allowing for a frequency distribution 260, i.e. a histogram to be determined. An inverse cumulative distribution function (CDF) of the histogram results in a miss curve ratio or hit ratio curve 265.

Figure 4:
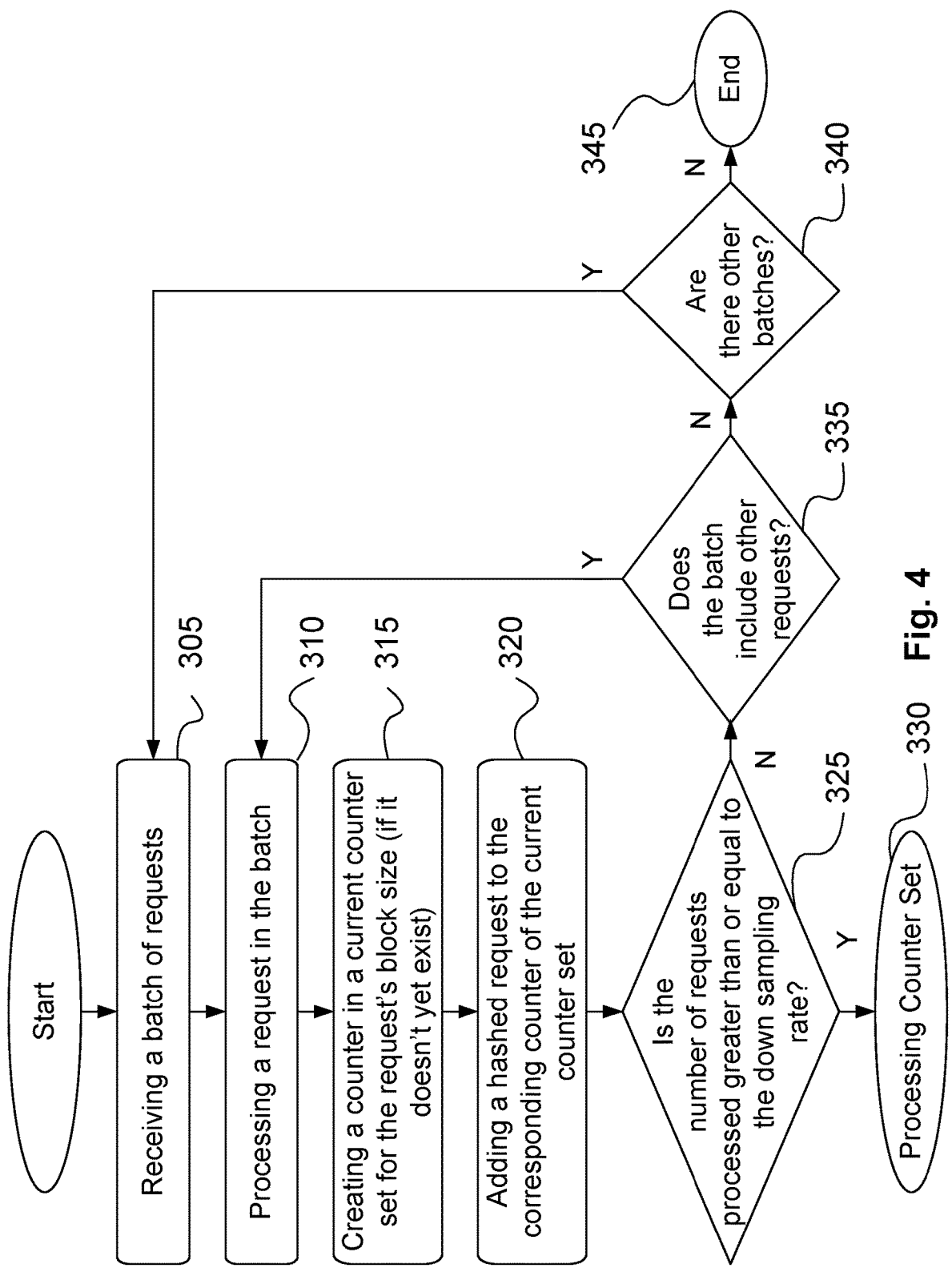
FIG. 4 is a flowchart illustrating a method to process a batch of requests to access variable-sized blocks, before determining a stack distance according to embodiments

FIG. 4 is a flowchart illustrating a method to process a batch of requests to access variable-sized blocks, before determining a stack distance according to embodiments. Requests come in as batches and the method of this flowchart determines how many requests should be included at each time step t. A counter is a HyperLogLog data structure, and the method involves hashing, for each request, an address key of the requested data block into a binary sequence; and adding each resulting binary sequence to a corresponding counter of the set of counters, i.e. the HyperLogLog data structure. When a down sampling rate threshold is reached, the count of requests is sufficient, and the counter set can be processed with the stack of counter sets.

Each access to a memory block can be referred to as a request, and initially, a processing system receives 305 a batch of requests. Then, it can process 310 a request in the batch and create 315 a counter in a current counter set, that corresponds to the block size of the memory block requested. The processing system then adds 320 a hashed value of a request to the corresponding counter of the current counter set. Each counter is a HyperLogLog data structure that uses the hashed value of a request to determine an approximated unique count of requests.

If 325 the number of processed requests is greater than or equal to the down sampling rate, then the counter set can be processed with the stack 330. Otherwise 335, if there are other requests, another request can be processed 310; otherwise 340, another batch can be received 305, until none are left 345, at which point the process can end.

Figure 5:
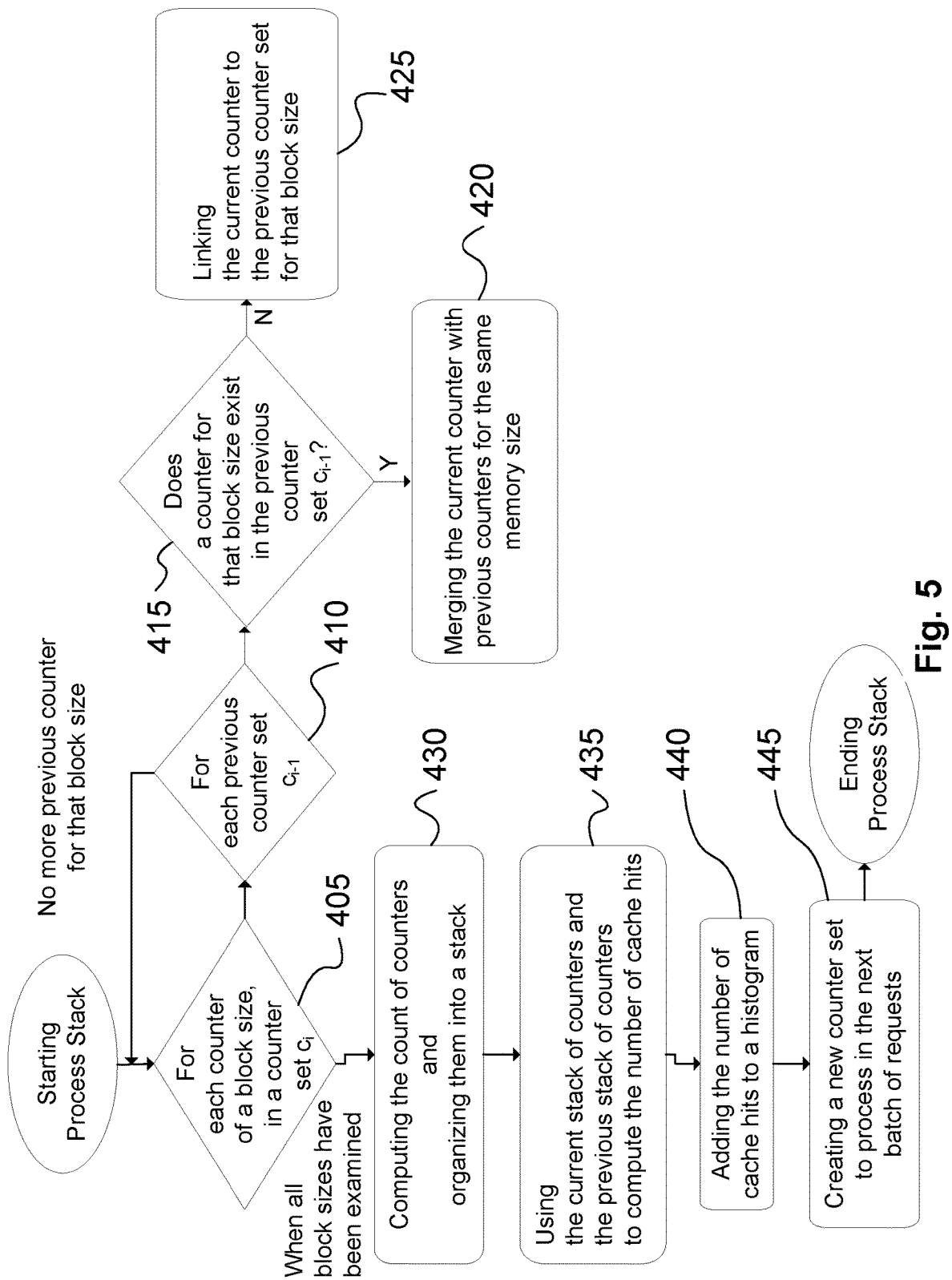
FIG. 5 is a flowchart illustrating steps for computing a number of hits in a cache based on a method according to an embodiment.

FIG. 5 is a flowchart illustrating steps for computing a number of hits in a cache based on a method according to an embodiment. The computed number of hits can then be added to a frequency distribution of stack distances (histogram), that can be used to draw a scatter plot.

For each counter 405 of a given block size, in a counter set $C_i$, each previous counter set $C_{i-1}$ 410 is examined for a counter for the same block size 415. If a counter for that block size exists in the previous counter set $C_{1-1}$, then the current counter can be merged 420 with previous counters for the same memory block size. If none exist, then the current counter can be linked 425 to the previous counter set $C_{i-1}$ for that block size.

When all participating block sizes have been examined, this method can include computing 430 the count of counters and organizing them into a stack. Then, the number of cache hits can be computed 435 by using the current stack of counters and the previous stack of counters.

The method can include adding 440 the number of hits to a histogram and creating 445 a new counter set for processing a subsequent batch of requests.

In other words, the method involves merging counters with previous counters having the same memory block size; computing a number of cache hits using a current stack of counters and the previous stack of counters; and considering the number of hits in a frequency distribution of the stack distances for generating the miss ratio curve.

By computing the number of hits, an embodiment provides the ability to allocate a required cache size, which is important for an auto scaling feature of a caching service.

A method according to embodiments can allow a smaller amount of memory usage to be sufficient. Such smaller amount can be achieved with data structures having a smaller number of block sizes, a smaller number of counter sets, and a smaller number of counters in each counter set.

In embodiments, a block size that is a power of 2 can be sufficient, but a base other than two can also be used. Also, an access to a memory block can be rounded up to the next block size. For example, if a counter set supports memory blocks of 2K and 4K, and there is request for to a 3.5K block, it can be rounded up to access a 4K block. More generally, if a request is for a memory block of a size that is not available, the access can be for an available memory block of a size corresponding to a rounding up of the memory block size being requested.

In embodiments, a memory block can have a block size ranging from 1 byte to $2^m$ bytes, where m is an integer. Once a value for exponent m is selected, the number $n_c$ of counters in a set of counters can be limited to $n_c$=m+1. More generally, the size of a memory block can be $B^m$ bytes, B and m being integers, and a number $n_c$ of counters in a set of counters is limited to $n_c$=m+1.

A method according to embodiments can support counter pruning, counter set pruning, as well as variations.

A counter can be pruned whenever its value is at least (1−δ) times the corresponding counter in the next oldest counter set, where δ is a number indicating the difference between two counters, as defined by a user, below which a method considers them to be the same counter, and prunes one of them. In an example, δ=0.01. More generally pruning a counter can be performed if the counter's value is at least (1−δ) times the value of a corresponding counter in the next oldest set of counters, δ being a real number selected based on a memory limitation.

A set of counters can be pruned (counter set pruning) when the value in each one of its counters is at least (1−δ) times the value of a corresponding counter in the next oldest set of counters.

Figure 6:
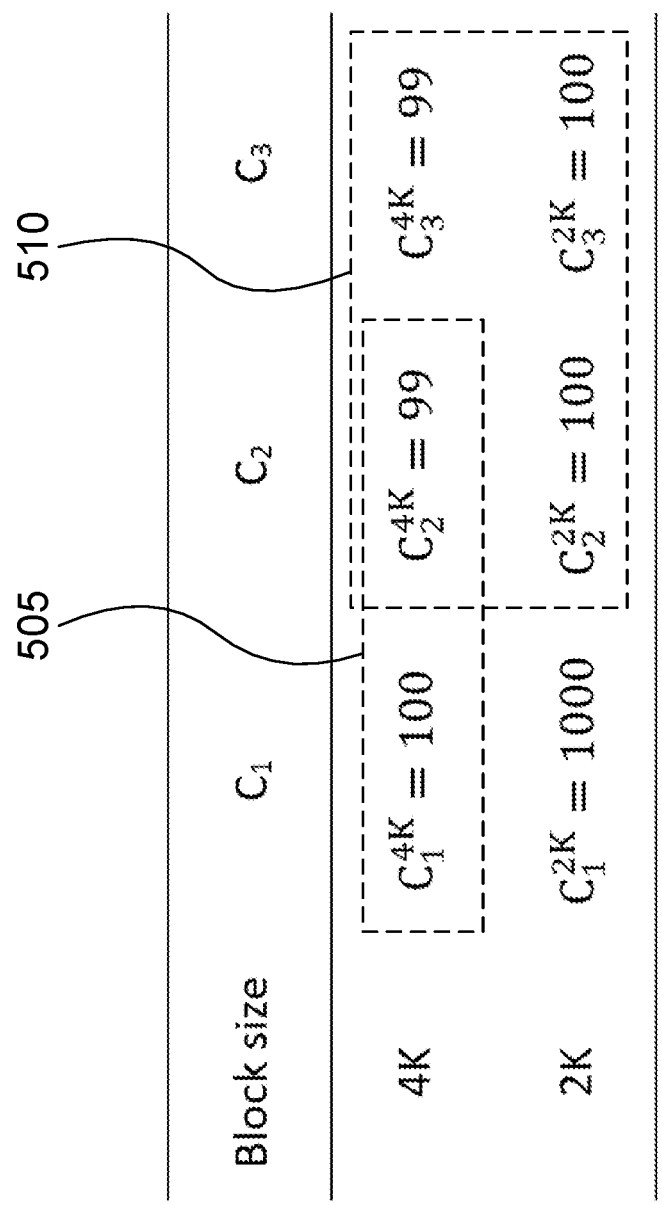
FIG. 6 illustrate three counter sets of 2 counters each, one counter for block size of 4K and one counter for a block size of 2K, according to an embodiment.

FIG. 6 illustrate 3 counter sets of 2 counters each, one counter for a block size of 4K and one counter for a block size of 2K, according to an embodiment. In FIG. 5, counter $c_2^{4K}$=99 can be pruned 505, because its value is at least 1−0.01=0.99 times the value of the next oldest counter $c_1^{4K}$=100. Similarly, counter set $c_3$ can be pruned 510, because the values of its counters are at least 1−0.01=0.99 times the values of the next oldest counter set.

Figure 7:
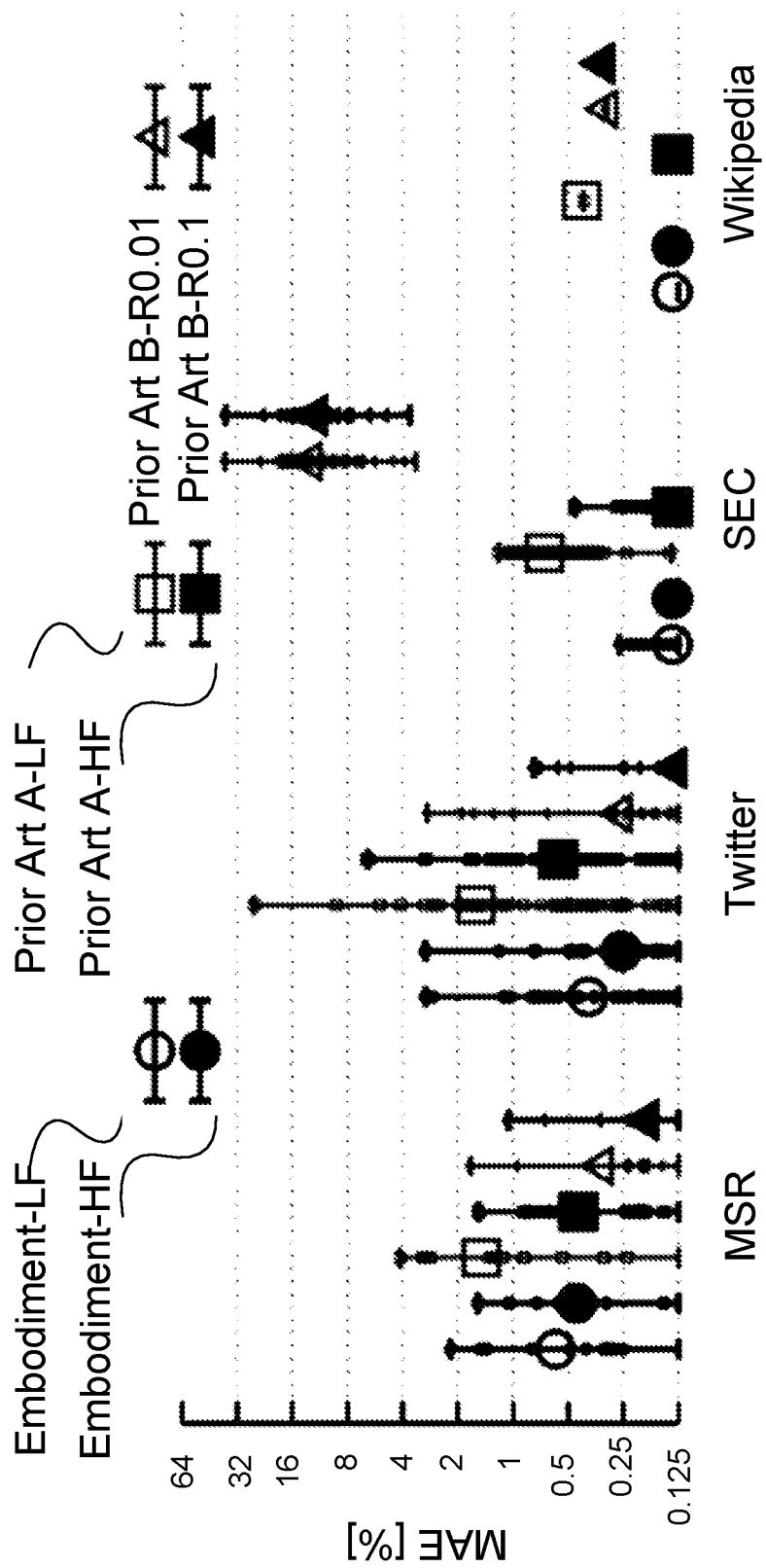
FIG. 7 is a graph comparing the mean absolute error between MRC calculations according to an embodiment, and MRC calculations according to prior art.

FIG. 7 is a graph comparing the mean absolute error between MRC calculations according to an embodiment, and MRC calculations according to prior art. These are for publicly available trace collections, i.e. sequences of requests accessing data blocks, including one from the Cambridge Microsoft Research Lab (MSR) (Dushyanth Narayanan, Austin Donnelly, and Antony Rowstron. Write off-loading: Practical power management for enterprise storage. ACM Trans. Storage, pages 10:1-10:23, 10 2008.), one from Twitter (Juncheng Yang, Yao Yue, and KV Rashmi. A large scale analysis of hundreds of in-memory cache clusters at Twitter. In Proc. $14^{th}$ Symp. On Operating Systems Design and Implementation (OSDI'20), pages 191-208, 2020), one from the SEC (U.S. Securities and Exchange Commission (SEC), James Ryans. Using the EDGAR log file data set. Available at SSRN 2913612, 2017.), and one from Wikipedia (Guido Urdaneta, Guillaume Pierre, and Maarten Van Steen. Wikipedia workload analysis for decentralized hosting. Computer Networks, 53(11):1830-1845, 2009).

Overall, low fidelity (LF) and high-fidelity (HF) methods according to embodiments perform with a mean absolute error (MAE) that is less than that of prior art method A at LF and HF (Jake Wires, Stephen Ingram, Zachary Drudi, Nicholas J A Harvey, and Andrew Warfield. Characterizing storage workloads with counter stacks. In Proc. 11th Symp. on Operating Systems Design and Implementation (OSDI'14), pages 335-349, 2014.), and less than that of prior art method B at sampling rates R0.01 and R0.1 (] Carl A Waldspurger, Nohhyun Park, Alexander Garthwaite, and Irfan Ahmad. Efficient MRC construction with SHARDS. In Proc. 13th USENIX Conf. on File and Storage Technologies (FAST'15), pages 95-110, 2015.).

Figure 8:
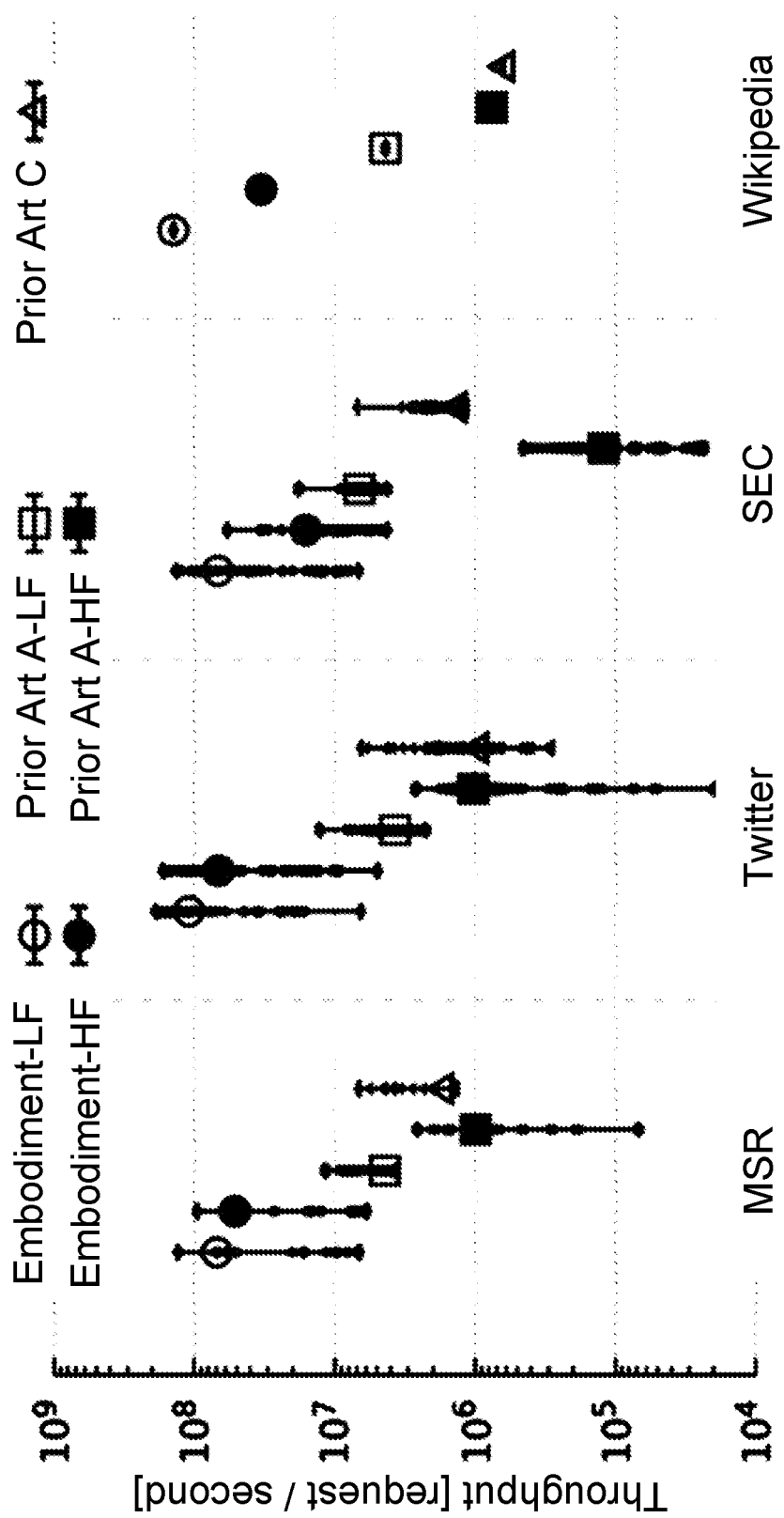
FIG. 8 is a graph comparing the throughput, in requests per second, for MRC calculations according to an embodiment, with the throughput for MRC calculations according to prior art.

FIG. 8 is a graph comparing the throughput, in requests per second, for MRC calculations according to an embodiment, with the throughput for MRC calculations according to prior art. Prior art results are for method A as in FIG. 6, as well as for a prior art method C (Frank Olken. Efficient methods for calculating the success function of fixed-space replacement policies. Master's thesis, University of California, Berkeley), 1981.). Methods according to embodiments are shown to have a greater throughput than those of prior art method A and prior art method C.

A counter can be replaced with a pointer that points to the next oldest corresponding counter.

In a method according to an embodiment, if memory space limitations are exceeded, the space complexity, i.e. the amount of memory space required to complete an execution, can be held constant by invoking successive pruning operations, while incrementing $\delta$ at each repetition, until at least one of the existing counters is pruned. More generally, if the number of counters is greater than a threshold determined by memory space limitations, successive pruning operations can be invoked, while increasing $\delta$ at each repetition, until at least one of the existing counters is pruned.

A method according to embodiments can define a minimum number of counters required, by supporting a number n of counters equal to $n=2(m-l+1)$, where m and l are integers defining the range of block sizes that are supported: from $2^l$ bytes to $2^m$ bytes. This method is used to define a lower bound on the number of counters needed.

Embodiments include a more practical way to predict caching usage, which can benefit any system in terms of resource management. Because a caching pattern is a fundamental pattern in a computer system, any chip or application using a cache can benefit from improved caching.

Figure 9:
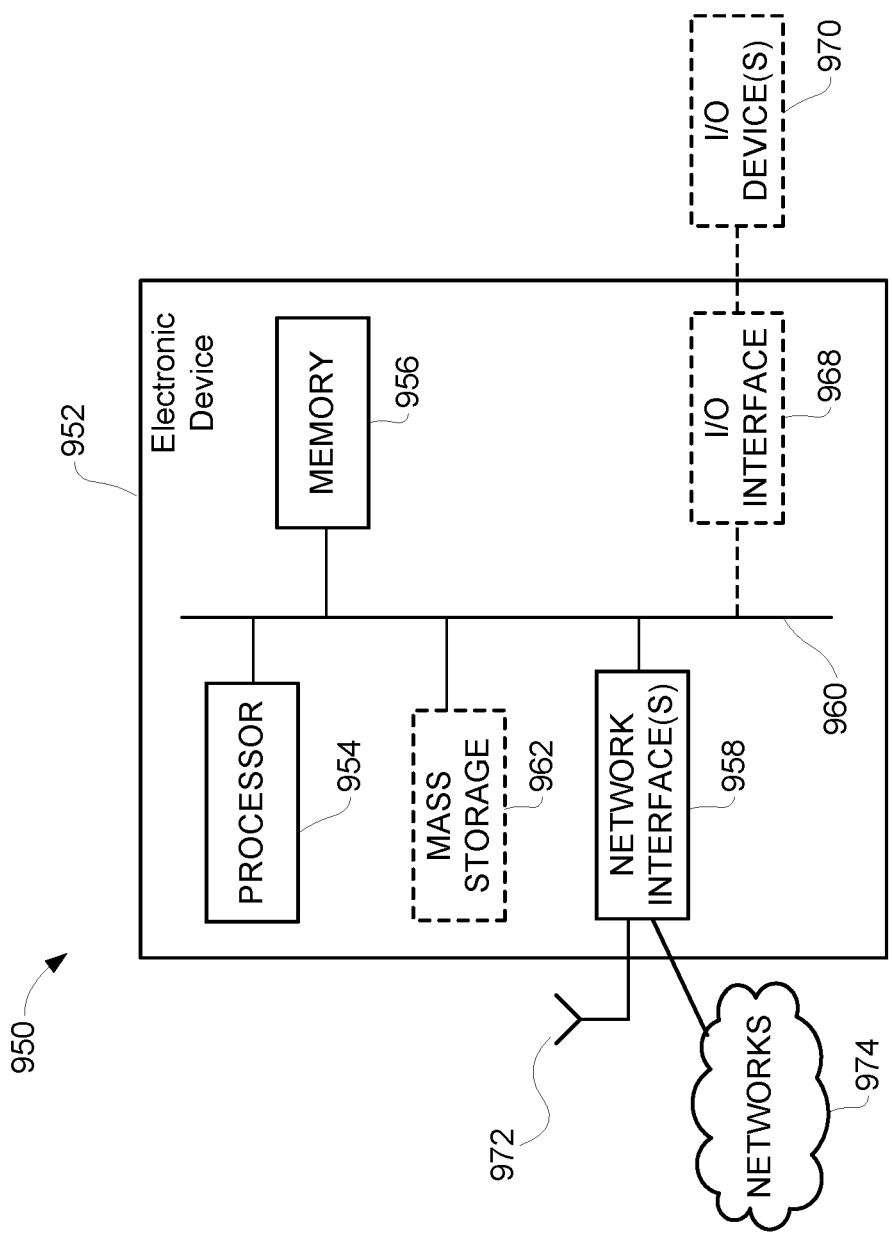
FIG. 9 is a block diagram of an electronic device (ED) 952 illustrated within a computing and communications environment 950 that may be used for implementing the devices and methods disclosed herein, such as determining an MRC.

FIG. 9 is a block diagram of an electronic device (ED) 952 illustrated within a computing and communications environment 950 that may be used for implementing the devices and methods disclosed herein, such as a system for determining a cache miss ratio curve. The electronic device 952 typically includes a processor 954, such as a central processing unit (CPU), and may further include specialized processors such as a field programmable gate array (FPGA) or other such processor, a memory 956, a network interface 958 and a bus 960 to connect the components of ED 952. ED 952 may optionally also include components such as a mass storage device 962, a video adapter 964, and an I/O interface 968 (shown in dashed lines).

The memory 956 may comprise any type of non-transitory system memory, readable by the processor 954, such as static random-access memory (SRAM), dynamic random-access memory (DRAM), synchronous DRAM (SDRAM), read-only memory (ROM), or a combination thereof. In an embodiment, the memory 956 may include more than one type of memory, such as ROM for use at boot-up, and DRAM for program and data storage for use while executing programs. The bus 960 may be one or more of any type of several bus architectures including a memory bus or memory controller, a peripheral bus, or a video bus.

The electronic device 952 may also include one or more network interfaces 958, which may include at least one of a wired network interface and a wireless network interface. A network interface 958 may include a wired network interface to connect to a network 974, and also may include a radio access network interface 972 for connecting to other devices over a radio link. The network interfaces 958 allow the electronic device 952 to communicate with remote entities such as those connected to network 974.

The mass storage 962 may comprise any type of non-transitory storage device configured to store data, programs, and other information and to make the data, programs, and other information accessible via the bus 960. The mass storage 962 may comprise, for example, one or more of a solid-state drive, hard disk drive, a magnetic disk drive, or an optical disk drive. In some embodiments, mass storage 962 may be remote to the electronic device 952 and accessible through use of a network interface such as interface 958. In the illustrated embodiment, mass storage 962 is distinct from memory 956 where it is included and may generally perform storage tasks compatible with higher latency but may generally provide lesser or no volatility. In some embodiments, mass storage 962 may be integrated with a heterogeneous memory 956.

In an embodiment, a system for determining a miss ratio curve can comprise at least one processor 954; a machine readable memory 956 storing machine readable instructions which when executed by the at least one processor 954, configures the at least one processor 954 to receive a plurality of requests, each request for accessing a cached data block of a specified size; generate a stack of sets of counters, each set being a map of at least two counters; determine a plurality of stack distances from the stack of sets of counters; generate a miss ratio curve from a frequency distribution of the stack distances; determine the cache size according to the miss ratio curve; and allocate a cache of the determined cache size to satisfy a given performance requirement. The network interface 974 and I/O interface 968 can also allow for storage and/or processing to occur externally.

In some embodiments, electronic device 952 may be a standalone device, while in other embodiments electronic device 952 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as ethernet or optical communications links, and in some instances may include wireless communication channels as well. If two different data centers are connected by a plurality of different communication channels, the links can be combined together using any of a number of techniques including the formation of link aggregation groups (LAGs). It should be understood that any or all of the computing, storage, and connectivity resources (along with other resources within the network) can be divided between different sub-networks, in some cases in the form of a resource slice. If the resources across a number of connected data centers or other collection of nodes are sliced, different network slices can be created.

Allocating a cache size means configuring a cache to have a certain selected size, or a certain selected maximum size.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations, or equivalents that fall within the scope of the present invention.

What is claimed is:

1. A method comprising: receiving, at each of a plurality of time steps, a respective one or more plurality of requests each requesting access to a respective cached data block having a respective specified size; generating, for each time step, a respective set of counters, each set of counters including a respective plurality of counters and corresponding to a same set of block sizes, the same set of block sizes including a plurality of unique block sizes, all the sets of counters generated before and at each time step defining, for the respective time step, a respective counter stack; setting, for each time step, each counter of the respective counter stack in accordance with a respective set of unique requests for the respective counter, each set of unique requests only including requests received inclusively between the generation of the respective counter and the respective time step, each set of unique requests further only including requests requesting access to different cached data blocks having specified sizes matching the block size corresponding to the respective counter; determining, for each time step, a respective stack distance for at least one set of counters of the respective counter stack, all of the stack distances defining a frequency distribution of stack distances; generating a miss ratio curve from the frequency distribution of stack distances; determining a cache size in accordance with the miss ratio curve; and allocating a cache having a respective size corresponding to the cache size to satisfy a given performance requirement.

2. The method of claim 1, wherein setting, for each time step, each counter of the respective counter stack in accordance with the respective set of unique requests for the respective counter includes: initializing each counter generated at the respective time step to "1" when the block size corresponding to the respective counter matches the specified memory size of the respective cached data block of at least one request received at the respective time step; initializing each counter generate at the respective time step to "0" when the block size corresponding to the respective counter does not match the specified memory size of the respective cached data block of at least one request received at the respective time step; and incrementing each counter generated before the respective time step when: the block size corresponding to the respective counter matches the specified memory size of the respective cached data block of at least one request received at the respective time step, and each of the at least one requests received requests access to cached data blocks having specified memory sizes different from the specified memory sizes of the cached data blocks of requests received from the generation of the respective counter and until the respective time step.

3. The method of claim 2, wherein determining, for each time step, the respective stack distance for at least one set of counters of the respective counter stack, includes:

identifying, at the respective time step, a first counter of a first set of counters in the respective counter stack and a second counter of a second set of counters in the respective counter stack, each of the first counter and the second counter corresponding to one same block size of the same set of block sizes and to the specified size of the cached data block of one request received at the respective time step, the first counter being unchanged when setting, for the respective time step, the first counter, the second counter being incremented when setting, for the respective time step, the second counter; and selecting the second counter to form the respective stack distance.

4. The method of claim 1, wherein:

each request includes a respective address key to the respective cached data block;

the plurality of unique block sizes depends from the specified sizes of the cached data blocks of the one or more requests received for each time step;

the method further comprises:

hashing, for each request, the respective address key into a respective binary sequence; and generating, for each time step, the respective set of counters includes:

adding, to each counter of the respective set of counters, the respective binary sequence of one request, the respective specified size of the respective cached data block of the one request matching the block size corresponding to the respective counter.

5. The method of claim 4, wherein:

the method further comprises:

merging, for each time step, one counter of the respective counter stack with a corresponding counter of the counter stack of a respective immediately preceding time step, each of the one counter and the corresponding counter corresponding to one same block size of the same set of block sizes; and computing, for each time step, a respective number of cache hits using the respective counter stack and the respective counter stack of the respective immediately preceding time step; and generating the miss ratio curve from the frequency distribution of stack distances includes:

considering each number of cache hits in the frequency distribution of stack distances.

6. The method of claim 1, wherein:

each block size of the same set of block sizes is defined by $B^m$ bytes, B and m being integers; and each set of counters is limited to including $n_c=m+1$ counters.

7. The method of claim 1, further comprising:

pruning, for each time step, each counter of the respective counter stack when the respective counter is at least $(1-\delta)$ times corresponding counter of the counter stack of a respective immediately preceding time step, $\delta$ being a real number selected based on a memory limitation.

8. The method of claim 7, wherein:

each counter stack defines a respective number of counters; and the method further comprises:

for each time step, when the respective number of counters of the respective counter stack is greater than a threshold determined by memory space limitations, increasing $\delta$ successively until at least one counter of the respective counter stack is pruned.

9. The method of claim 1, further comprising:
rounding, for each time step, the respective specified size of the respective cached data block of each request up to one block size of the same set of block sizes, the one block size being the next larger block size of the same set of block sizes with respect to the respective specified size.

10. The method of claim 1, wherein each counter is a hyperloglog (HLL) counter.

11. The method of claim 1, wherein generating the miss ratio curve from the frequency distribution of stack distances includes generating an inverse cumulative distribution function (CDF) of the frequency distribution of stack distances.

12. A system comprising: at least one processor, at least one cache, and machine readable memory storing machine readable instructions which when executed by the at least one processor, configures the at least one processor to; receive, at each of a plurality of time steps, a respective one or more requests each requesting access a respective cached data block having a respective specified size; generate, for each time step, a respective set of counters, each set of counters including a respective plurality of counters and corresponding to a same set of block sizes, the same set of block sizes including a plurality of unique block sizes, all the sets of counters generated before and at each time step defining, for the respective time step, a respective counter stack; setting, for each time step, each counter of the respective counter stack in accordance with a respective set of unique requests for the respective counter, each set of unique requests only including requests received inclusively between the generation of the respective counter and the respective time step, each set of unique requests further only including requests requesting access to different cached data blocks having specified sizes matching the block size corresponding to the respective counter; determine, for each time step, a respective stack distance for at least one set of counters of the respective counter stack, all of the stack distances defining a frequency distribution of stack distances; generate a miss ratio curve from the frequency distribution of stack distances; determine a cache size in accordance with the miss ratio curve; and allocate one of the at least one cache having a respective size corresponding to the cache size to satisfy a given performance requirement.

13. The system of claim 12, wherein the machine readable memory storing machine readable instructions further configures the at least one processor to:
prune, for each time step, each counter of the respective counter stack when the respective counter is at least $(1-\delta)$ times a corresponding counter of the counter stack of a respective immediately preceding time step, $\delta$ being a real number selected based on a memory limitation.

14. The system of claim 13, wherein:
each counter stack defines a respective number of counters; and
the machine readable memory storing machine readable instructions further configures the at least one processor to:
for each time step, when the respective number of counters of the respective counter stack is greater than a threshold determined by memory space limitations, increasing $\delta$ successively until at least one counter of the respective counter stack is pruned.

15. The system of claim 12, wherein the machine readable memory storing machine readable instructions further configures the at least one processor to:
round, for each time step, the respective specified size of the respective cached data block of each request up to one block size of the same set of block sizes, the one block size being the next larger block size of the same set of block sizes with respect to the respective specified size.

16. The system of claim 12, wherein each counter is a hyperloglog (HLL) counter.

* * * * *